US008646356B2

(12) United States Patent
Horie et al.

(10) Patent No.: US 8,646,356 B2
(45) Date of Patent: Feb. 11, 2014

(54) SPRING DAMPER AND ACCELERATION DEVICE USING THE SAME

(75) Inventors: Kazuyuki Horie, Nagoya (JP); Yoshinori Inuzuka, Okazaki (JP)

(73) Assignee: Denso Corporation, Kariya (JP)

( * ) Notice: Subject to any disclaimer, the term of this patent is extended or adjusted under 35 U.S.C. 154(b) by 483 days.

(21) Appl. No.: 12/702,513

(22) Filed: Feb. 9, 2010

(65) Prior Publication Data

US 2010/0199800 A1    Aug. 12, 2010

(30) Foreign Application Priority Data

Feb. 9, 2009 (JP) ................................ 2009-027342

(51) Int. Cl.
     *G05G 1/30*          (2008.04)
     *F16F 3/06*          (2006.01)

(52) U.S. Cl.
     USPC .............................. 74/513; 74/560; 267/287

(58) Field of Classification Search
     USPC ............... 74/512–514, 560; 267/92, 216, 267/167–169, 174, 178–180, 204, 286, 267/290; 280/124.145; 384/215, 220; 403/215, 220, 225, 228, 372, 365
     IPC .......................................................... F16F 3/04
     See application file for complete search history.

(56) References Cited

U.S. PATENT DOCUMENTS

| 1,934,579 | A | * | 11/1933 | Wine | .................................. 267/4 |
| 3,166,950 | A | * | 1/1965 | Pomeranz | ....................... 74/526 |
| 3,515,417 | A | * | 6/1970 | Bowman | ........................ 403/366 |
| 3,665,777 | A | * | 5/1972 | Jensen | ............................. 74/492 |
| 4,636,106 | A | * | 1/1987 | Waisbrod | ...................... 403/228 |
| 5,033,871 | A | * | 7/1991 | Ide | ................................... 384/98 |
| 7,823,481 | B2 | | 11/2010 | Makino et al. | |
| 2005/0087970 | A1 | * | 4/2005 | Ulintz | ............................ 280/775 |
| 2005/0183535 | A1 | * | 8/2005 | Makino et al. | ................... 74/513 |
| 2007/0157755 | A1 | * | 7/2007 | Kim et al. | ........................ 74/513 |
| 2009/0071286 | A1 | * | 3/2009 | Ueno et al. | ....................... 74/513 |
| 2009/0272607 | A1 | * | 11/2009 | Fischer et al. | ............... 188/72.6 |

FOREIGN PATENT DOCUMENTS

| JP | 51-065149 | 5/1976 |
| JP | 2001-023457 | 1/2001 |
| JP | 2007-113525 | 5/2007 |
| WO | WO 2008055695 A1 * | 5/2008 | ............ F16D 55/227 |

OTHER PUBLICATIONS

Japanese Office Action dated Dec. 13, 2010, issued in corresponding Japanese Application No. 2009-027342 with English Translation.

\* cited by examiner

*Primary Examiner* — Thomas Diaz
(74) *Attorney, Agent, or Firm* — Nixon & Vanderhye P.C.

(57) ABSTRACT

A spring damper for absorbing vibration of a double coil spring is made of elastic material and composed of a cylindrical body, outer-wall convex portions, and inner-wall convex portions. The spring damper is arranged in an annular space formed between an outer coil spring and an inner coil spring of the double coil spring, so that the outer-wall convex portions push the outer coil spring in a radial outward direction and the inner-wall convex portions push the inner coil spring in a radial inward direction. Longitudinal ends of the cylindrical body are prevented from being hooked by spring wires of the outer or inner coil spring, when the double coil spring is expanded and compressed.

8 Claims, 15 Drawing Sheets

SPRING DAMPER AND ACCELERATION DEVICE USING THE SAME

CROSS REFERENCE TO RELATED APPLICATION

This application is based on Japanese Patent Application No. 2009-027342 filed on Feb. 9, 2009, the disclosure of which is incorporated herein by reference.

FIELD OF THE INVENTION

The present invention relates to a spring damper for attenuating vibration of a double coil spring and also relates to an acceleration device for a vehicle using such spring damper.

BACKGROUND OF THE INVENTION

An acceleration device is known in the art, according to which the acceleration device is mounted in a vehicle so that a vehicle driving condition is controlled depending on a pedal stroke operated by a vehicle driver. In such a conventional acceleration device, an acceleration pedal is rotatably supported by a supporting member, which is fixed to a vehicle body. The acceleration pedal is rotated in a forward direction by the operation of the vehicle driver and rotated in a reverse direction by a reactive force of a double coil spring when driver's stepping force is released from the acceleration pedal.

According to an acceleration device, for example, as disclosed in Japanese Patent Publication No. 2007-113525, a spring damper, which is made of elastic material and formed in a cross shape, is disposed in an annular space formed between an outer coil spring and an inner coil spring of a double coil spring. The spring damper attenuates vibrations of the outer and inner coil springs so as to suppress generation of abnormal noise resulting from the vibrations.

According to the spring damper of this kind, however, there is a concern that a forward end of the cross-shaped spring damper may be easily inserted into a longitudinal gap of spring wires of the outer coil spring and may outwardly protrude when the double coil spring is expanded. When the forward end of the spring damper, which has outwardly protruded from the outer coil spring through the longitudinal gap, is compressed between the neighboring spring wires during the compression of the double coil spring, it may become difficult for the spring damper to sufficiently attenuate the vibrations of the outer and inner coil springs.

The double coil spring has the outer and inner coil springs, diameters of which are different from each other depending on characteristic of pedal stepping force for the acceleration device to be mounted on various types of vehicles. Therefore, the annular space formed between the outer and inner coil springs varies depending on a combination of the outer and inner coil springs. It is difficult for the cross-shaped spring damper to surely push both of the outer and inner coil springs to thereby attenuate the vibrations thereof, when one type of the cross-shaped spring damper is applied to various types of the double coil springs having different annular spaces between the outer and inner coil springs.

SUMMARY OF THE INVENTION

The present invention is made in view of the above problems. It is an object of the present invention to provide a spring damper which can surely attenuate vibration of a double coil spring. It is a further object of the invention to provide an acceleration device to which the above spring damper is applied.

According to a feature of the invention, a spring damper is made of elastic material and applied to a double coil spring. The spring damper has a cylindrical body to be arranged in an annular space formed between an outer coil spring and an inner coil spring of the double coil spring. A plurality of outer-wall convex portions are formed at an outer wall of the cylindrical body and extending in a longitudinal direction of the cylindrical body from its one longitudinal end to the other longitudinal end, wherein the outer-wall convex portions outwardly project for pushing the outer coil spring in a radial outward direction. A plurality of inner-wall convex portions are formed at an inner wall of the cylindrical body and extending in the longitudinal direction of the cylindrical body from its one longitudinal end to the other longitudinal end, wherein the inner-wall convex portions inwardly project for pushing the inner coil spring in a radial inward direction.

According to such a feature, the outer-wall convex portions slide on the outer coil spring when the double coil spring is expanded and/or compressed, so that the spring damper attenuates vibration of the outer coil spring. In a similar manner, the inner-wall convex portions slide on the inner coil spring when the double coil spring is expanded and/or compressed, so that the spring damper attenuates vibration of the inner coil spring. Furthermore, the outer-wall convex portions suppress contacts between outer wall portions of the cylindrical body and the outer coil spring, while the inner-wall convex portions suppress contacts between inner wall portions of the cylindrical body and the inner coil spring. As a result, longitudinal ends of the cylindrical body are prevented from being hooked by spring wires of the outer or inner coil spring when the double coil spring is expanded and compressed in its longitudinal direction, so that the vibration of the double coil spring can be surely attenuated.

According to the feature of the invention, a cross sectional shape of the cylindrical body may be elastically changed (deformed) between a circular form and a polygonal form, so that an effective radius of a circumscribing circle of the outer-wall convex portions (which is in contact with the outer coil spring) as well as an effective radius of an inscribing circle of the inner-wall convex portions (which is in contact with the inner coil spring) can be changed. Therefore, the spring damper of the invention may be applied to various types of the double coil springs, which have different coil diameters in the outer and inner coil springs.

According to another feature of the invention, a cross sectional shape of the cylindrical body is formed in a polygonal form before the spring damper is assembled to the annular space between the outer and inner coil springs, and the cylindrical body absorbs variations of the annular space formed between the outer coil spring and the inner coil spring by elastic deformation of the cylindrical body when it is assembled into the annular space. Therefore, the spring damper of the invention may be applied to various types of the double coil springs, which have different coil diameters in the outer and inner coil springs.

According to a further feature of the invention, the outer-wall convex portions are formed at edge portions of the cylindrical body of the polygonal form, while the inner-wall convex portions are formed at intermediate portions of respective side portions of the cylindrical body of the polygonal form.

According to such a feature, the cylindrical body may be deformed depending on a variety of combinations of the outer and inner coil springs, diameters of which are different from each other. Namely, the edge portions are deformed in the radial inward direction, while the side portions are deformed in the radial outward direction, so that the cylindrical body surely generates reactive force due to the elastic deformation. The outer-wall convex portions apply the reactive force of the cylindrical body to the outer coil spring, while the inner-wall convex portions apply the reactive force of the cylindrical body to the inner coil spring. As a result, the spring damper can surely attenuate the vibration of the double coil spring.

According to a further feature of the invention, each of the outer-wall convex portions has tapered portions at the longitudinal ends, wherein a projecting amount of the tapered portion is gradually reduced toward a forward end of the respective longitudinal ends.

The tapered portions prevent the outer-wall convex portions from being hooked by spring wires of the outer coil spring, when the spring damper is assembled into the space formed between the outer and inner coil springs and/or when the double coil spring is expanded and compressed after the spring damper is assembled to the double coil spring. As a result, the tapered portions prevent longitudinal forward ends of the spring damper from being inserted into longitudinal gaps between neighboring spring wires of the outer coil spring.

According to a still further feature of the invention, each of the inner-wall convex portions likewise has tapered portions at the longitudinal ends, wherein a projecting amount of the tapered portion is gradually reduced toward the forward end of the respective longitudinal ends.

The tapered portions prevent the inner-wall convex portions from being hooked by spring wires of the inner coil spring, when the spring damper is assembled into the space formed between the outer and inner coil springs and/or when the double coil spring is expanded and compressed after the spring damper is assembled to the double coil spring. As a result, the tapered portions prevent longitudinal forward ends of the spring damper from being inserted into longitudinal gaps between neighboring spring wires of the inner coil spring.

According to a still further feature of the invention, the outer-wall and the inner-wall convex portions are inclined from a radial direction of the cylindrical body, so that the outer-wall and the inner-wall convex portions are elastically deformed depending on the annular space formed between the outer and the inner coil springs.

According to such a feature, the spring damper can be commonly used to different types of the double coil spring, wherein diameters of the outer and inner coil springs of one type are different from those of the other type.

According to a still further feature of the invention, the outer-wall convex portions and the inner-wall convex portions are formed at such positions, which are close to each other in a circumferential direction of the cylindrical body.

According to such a feature, the outer-wall convex portions and the inner-wall convex portions do not lose reactive forces of the elastic deformation, even in the case that side portions of the cylindrical body adjacent to the outer-wall and inner-wall convex portions are deformed. As a result, the outer-wall and inner-wall convex portions can surely push the outer and inner coil springs, so that the spring damper can surely attenuate the vibration of the double coil spring.

According to a still further feature of the invention, an acceleration device for a vehicle has a supporting member, an acceleration pedal rotatably supported by the supporting member and operated by a vehicle driver, a double coil spring having an outer coil spring and an inner coil spring for biasing the acceleration pedal in a direction, which is opposite to a direction in which the acceleration pedal is moved when the vehicle driver pushes it, and a spring damper arranged in an annular space formed between the outer and inner coil springs. The spring damper has feature(s) already explained above.

According to such a feature, longitudinal ends of the spring damper are prevented from being inserted into a longitudinal gap formed between neighboring spring wires and thereby the spring damper is prevented from being compressed between the neighboring spring wires. As a result, the spring damper can surely attenuate vibration of the double coil spring. Furthermore, the spring damper can be commonly used to a variety of double coil springs, in which diameters of the outer and inner coil springs of one double coil spring are different from those of the other double coil spring.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be explained with reference to drawings showing multiple embodiments.

First Embodiment

According to a first embodiment of the present invention, a spring damper is applied to an acceleration device to be mounted on a vehicle. The acceleration device controls an operational condition of the vehicle in accordance with a pedal stroke of an acceleration pedal operated by a vehicle driver. The acceleration device is composed of an acceleration-by-wire type device, wherein a throttle device of the vehicle is not mechanically linked with the acceleration pedal. Instead, according to the acceleration device of this kind, a rotational angel of the acceleration pedal is electrically transmitted to an engine control unit (hereinafter also referred to as ECU), and the ECU controls the throttle device depending on the rotational angle.

Figure 1:
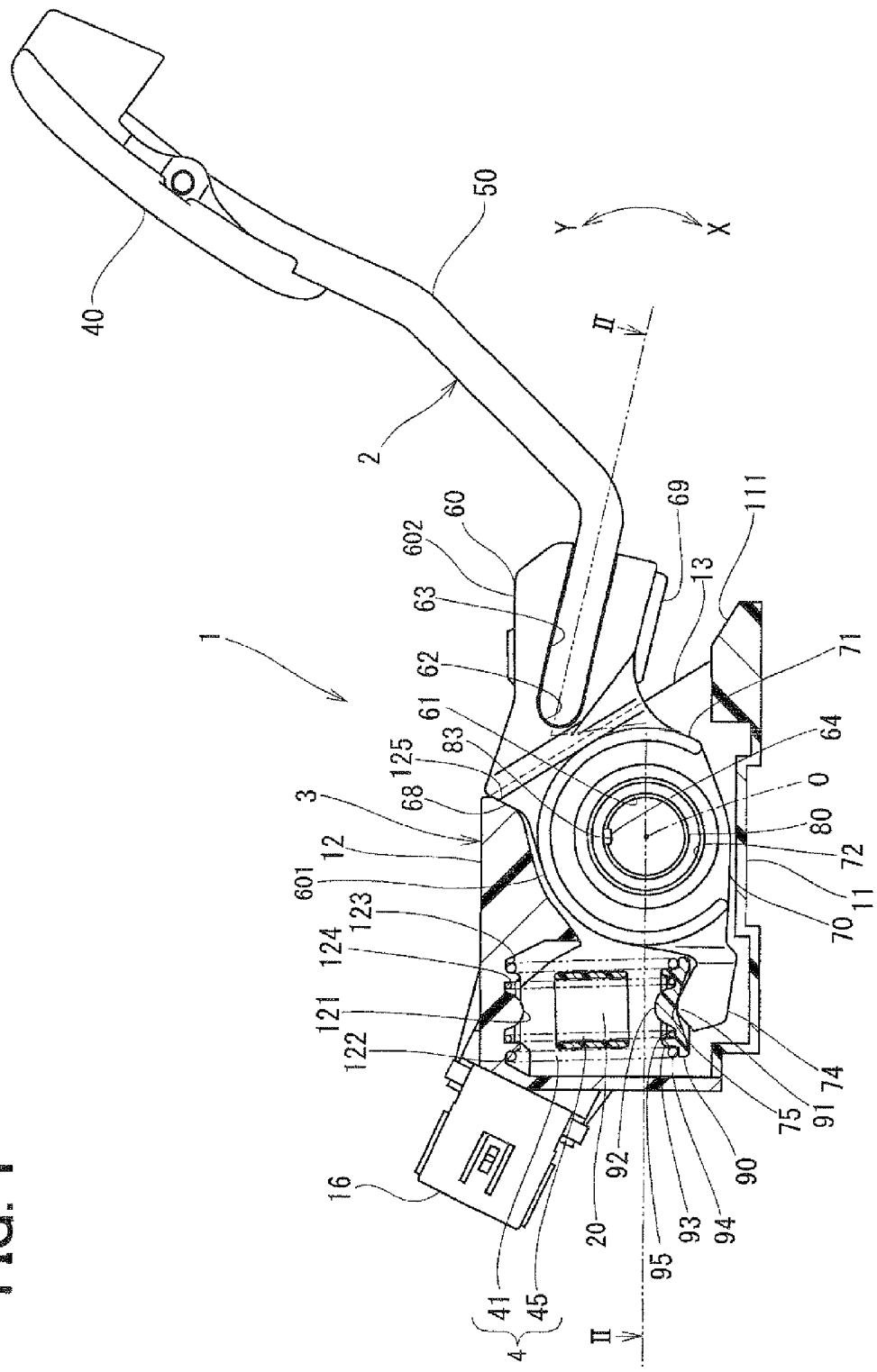
FIG. 1 is a schematic crass-sectional view showing an acceleration device according to a first embodiment of the invention.
Figure 2:
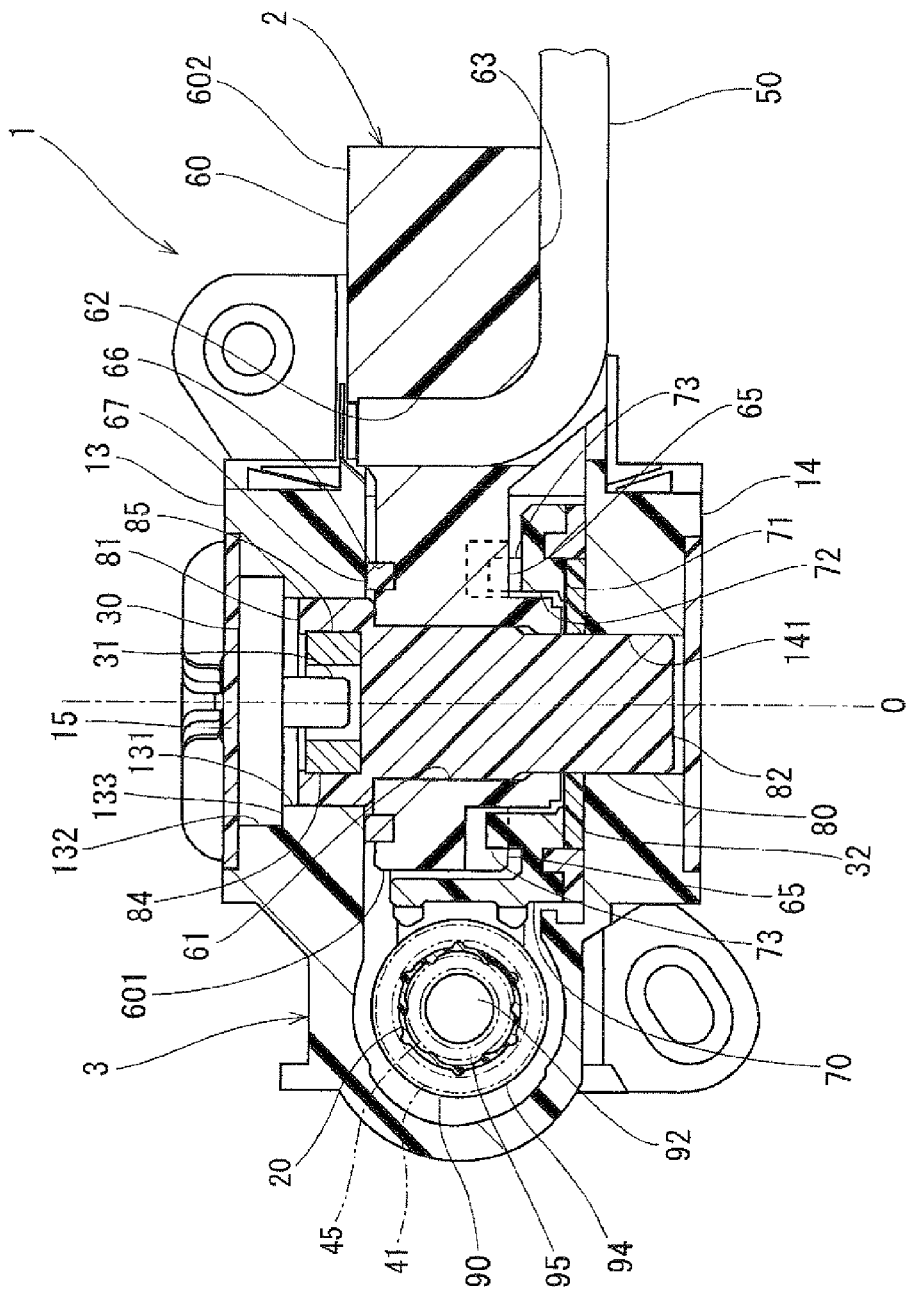
FIG. 2 is a schematic cross-sectional view taken along a line II-II in FIG. 1.

As shown in FIGS. 1 and 2, the acceleration device has a housing 3 as a supporting member, an acceleration pedal 2, a double coil spring 4, a rotational-angle sensor 30, a spring damper 20 and so on.

The housing 3 is made of resin and formed in a box shape, which is composed of a bottom plate 11, a top plate 12 opposing to the bottom plate 11, and a pair of side plates 13 and 14 opposing to each other and extending between and perpendicular to the bottom and top plates 11 and 12. The bottom plate 11 may be fixed to a vehicle body (not shown) by means of bolts, for example.

The side plate 13 has a bearing hole 131 and a sensor supporting hole 132. The bearing hole 131 and the sensor supporting hole 132 are formed next to each other so that an inner-wall side and an outer-wall side of the side plate 13 are communicated with each other. Each of the bearing hole 131 and the sensor supporting hole 132 is formed in a cylindrical shape. An inner diameter of the bearing hole 131 is smaller than that of the sensor supporting hole 132, so that a step portion 133 is formed between the bearing hole 131 and the sensor supporting hole 132. The rotational-angle sensor 30 is interposed between the step portion 133 and a housing cover 15 and accommodated in the sensor supporting hole 132. A connector 16 is provided at an outer wall of the side plate 13, wherein terminals electrically connected to the rotational-angle sensor 30 are embedded in the connector.

The other side plate 14 has a cylindrical bearing hole 141. A central axis line for the bearing holes 131 and 141 coincides with a rotational axis "O" of the acceleration pedal 2.

The acceleration pedal 2 is composed of a pedal arm 50, an operating portion 40, a pedal rotor 60, a spring rotor 70, and a shaft member 80. The pedal arm 50 is made of a bar-shaped metal. The operating portion 40, which is operated by a foot of the vehicle driver, is attached to one end of the pedal arm 2.

The pedal rotor 60 is made of resin and has a column-shaped rotor portion 601 and a supporting portion 602 outwardly protruding from an outer wall of the rotor portion 601 in a radial direction. The other end of the pedal arm 50 is bent at almost right angle and inserted into a small-diameter hole 62 and a grove 63 respectively formed in the supporting portion 602. The rotor portion 601 has a large-diameter hole 61 extending from one side to the other side in a direction of the rotational axis "O". The large-diameter hole 61 is formed in a cylindrical shape.

The shaft member 80 is made of resin and formed in a column-shaped form. The shaft member 80 is inserted into the large-diameter hole 61 of the rotor portion 601. One end 81 of the shaft member 80 is supported by an inner surface of the bearing hole 131, while the other end 82 of the shaft member 80 is supported by an inner surface of the bearing hole 141. A groove 83 is formed at an outer peripheral wall of the shaft member 80 in a radial direction. A projection 64 is formed at an inner peripheral surface of the large-diameter hole 61 in the radial direction. The projection 64 is engaged with the groove 83, so that the pedal rotor 60 is rotated around the rotational axis "O" together with the shaft member 80 with respect to the housing 3.

The one end 81 of the shaft member 80 is formed in a cylindrical shape and opened to a side of the rotational-angle sensor 30. A pair of magnets 84 and 85 is provided in an inner periphery of the one end 81, such that the magnets are symmetrical to each other in the radial direction about the rotational axis "O". The two magnets are connected to each other by a yoke (not shown). Direction of magnetic field formed by the yoke and the magnets 84 and 85 varies depending on a rotational angle of the shaft member 80. The rotational-angle sensor 30 has a cylindrical portion 31 projecting into the shaft member 80. A hall element, a magneto-resistive element or the like is provided in a forward end of the cylindrical portion 31. A gap is formed between the cylindrical portion 31 (i.e. the hall element or the like) and the magnets 84 and 85. The hall element (or the like) detects the magnetic field formed by the magnets 84 and 85 in a non-contacting manner with the shaft member 80. The rotational-angle sensor 30 outputs detected signal to the ECU electrically connected via the terminals (not shown). The detected signal corresponds to the rotational angle of the shaft member 80, that is, the rotational angle of the acceleration pedal 2.

The spring rotor 70 is composed of a rotating portion 71 of an annular shape and a projecting portion 74. The rotating portion 71 and the projecting portion 74 are integrally made of resin. The rotating portion 71 has a rotation hole 72 extending from one side to the other side in the direction of the rotational axis "O". The rotation hole 72 and the large-diameter hole 61 are coaxially arranged with each other. The spring rotor 70 is in contact with the pedal rotor 60 in the direction of the rotational axis "O". The shaft member 80 is inserted into the rotation hole 72 of the spring rotor 70, so that the spring rotor 70 is rotatable around the shaft member 80 (rotational axis "O").

A plurality of helical gears 73 are formed on a side surface of the rotating portion 71 such that the helical gears 73 project in a direction toward the pedal rotor 60. The helical gears 73 are formed at equal distances in a circumferential direction. In a similar manner, a plurality of helical gears 65 are formed on a side surface of the pedal rotor 60 (the rotor portion 601) such that the helical gears 65 project in a direction toward the rotating portion 71. The helical gears 65 are formed at equal distances in a circumferential direction, so that the helical gears 65 and the helical gears 73 face to each other in the direction of the rotational axis "O" and are engaged with each other. As a result of the engagement between the helical gears 65 and 73, the pedal rotor 60 and the spring rotor 70 rotate together. A friction washer 32 is disposed between the rotating portion 71 and the side plate 14, wherein the friction washer 32 is firmly fixed to the side plate 14 to generate a friction force between the rotating portion 71 and friction washer 32 when the rotating portion 71 slides on the friction washer 32. An annular groove 66 is formed on a side surface of the rotor portion 601 of the pedal rotor 60 facing to the side plate 13, and an annular friction ring 67 is press inserted into the groove 66, so that the friction ring 67 generates a friction force when the friction ring 67 slides on the side plate 13.

The projecting portion 74 is formed so as to outwardly project from an outer surface of the rotating portion 71 in a radial direction thereof. The projecting portion 74 has a curved convex surface 75 on a side toward the top plate 12.

A holder 90 is made of resin and formed in a disc-shape. The holder 90 has a curved concave surface 91 on a side to the projecting portion 74, wherein a curvature radius of the concave surface 91 is larger than that of the convex surface 75. The convex surface 75 and the concave surface 91 are in contact with each other in such a manner that a relative movement between them is allowed.

The holder 90 has a semispherical projection 92 on a side to the top plate 12 and annular spring-stopper portions 94 and 95 are formed on the same side of the holder 90 and at an outer periphery of the semispherical projection 92. The housing 3 has a semispherical projection 121 on a side to the holder 90 and annular spring-stopper portions 123 and 124 are formed on the same side of the housing 3 and at an outer periphery of the semispherical projection 121.

The double coil spring 4 is composed of an outer coil spring 41 and an inner coil spring 45. The outer and inner coil springs 41 and 45 are compression coil springs. An outer diameter of the inner coil spring 45 is made smaller than an inner diameter of the outer coil spring 41, so that the inner coil spring 45 is arranged in an inside of the outer coil spring 41. Each of the diameters of the outer and inner coil springs 41 and 45 is designed depending on a characteristic of force on the pedal for the acceleration device.

One end (an upper end) of the outer coil spring 41 is held at the annular spring-stopper portion 123 of the top plate 12, while the other end (a lower end) thereof is held at the annular spring-stopper portion 94. In a similar manner, one end (an upper end) of the inner coil spring 45 is held at the annular spring-stopper portion 124 of the top plate 12, while the other end (a lower end) thereof is held at the annular spring-stopper portion 93.

The pedal arm 50 as well as the spring rotor 70 is rotated in a direction of "X" shown in FIG. 1 when the vehicle driver pushes the operating portion 40. The outer and inner coil springs 41 and 45 bias the pedal arm 50 and the spring rotor 70 via the holder 90 in a direction "Y" shown in FIG. 1 opposite to the direction "X".

When the spring rotor 70 is rotated around the rotational axis "O", the double coil spring 4 can move (can be compressed and/or expanded) in a linear direction, since the holder 90 and the spring rotor 70 are in contact with each other in a way that the relative movement between them is allowed.

The spring damper 20 is made of, for example, such material as rubber, which is capable of elastic deformation. The spring damper 20 is disposed in an annular space formed between the outer and inner coil springs 41 and 45. The spring damper 20 attenuates characteristic vibrations of the outer and inner coil springs 41 and 45, to thereby suppress generation of noise resulting from the characteristic vibrations.

A configuration of the spring damper 20 will be explained with reference to FIGS. 3 to 6.

The spring damper 20 has a cylindrical body 21, a plurality of outer-wall convex portions 22, and a plurality of inner-wall convex portions 23. A cross sectional shape of the cylindrical body 21 is formed in a hexagonal shape before the spring damper 20 is assembled to the double coil spring 4. Each length of respective side portions of the hexagonal shape is made equal to the other. A longitudinal length of the cylindrical body 21 is made smaller than a longitudinal length of the double coil spring 4 when it is compressed.

Each of the outer-wall convex portions 22 outwardly projects from an outer wall of each edge portion of the cylindrical body 21 in a radial direction. Each of the outer-wall convex portions 22 extends in a longitudinal direction of the cylindrical body 21 from its one end to the other end. A cross sectional shape of the convex portion 22 is formed in a sector form. Each of the outer-wall convex portions 22 has tapered portions 24 at its longitudinal ends, wherein a projecting amount of the convex portion is reduced toward a forward end of the respective longitudinal ends.

Each of the inner-wall convex portions 23 inwardly projects from an intermediate portion of each side portion of the cylindrical body 21 in a radial direction, and extends in the longitudinal direction of the cylindrical body 21 from its one end to the other end. A cross sectional shape of the convex portion 23 is formed in a gradual chevron shape. Each of the inner-wall convex portions 23 has tapered portions 25 at its longitudinal ends, wherein a projecting amount of the convex portion is reduced toward a forward end of the respective longitudinal ends.

An applicable range of the spring damper 20, which will be used for the double coil spring 4, will be explained with reference to FIG. 3 and FIGS. 7 to 10.

Figure 3:
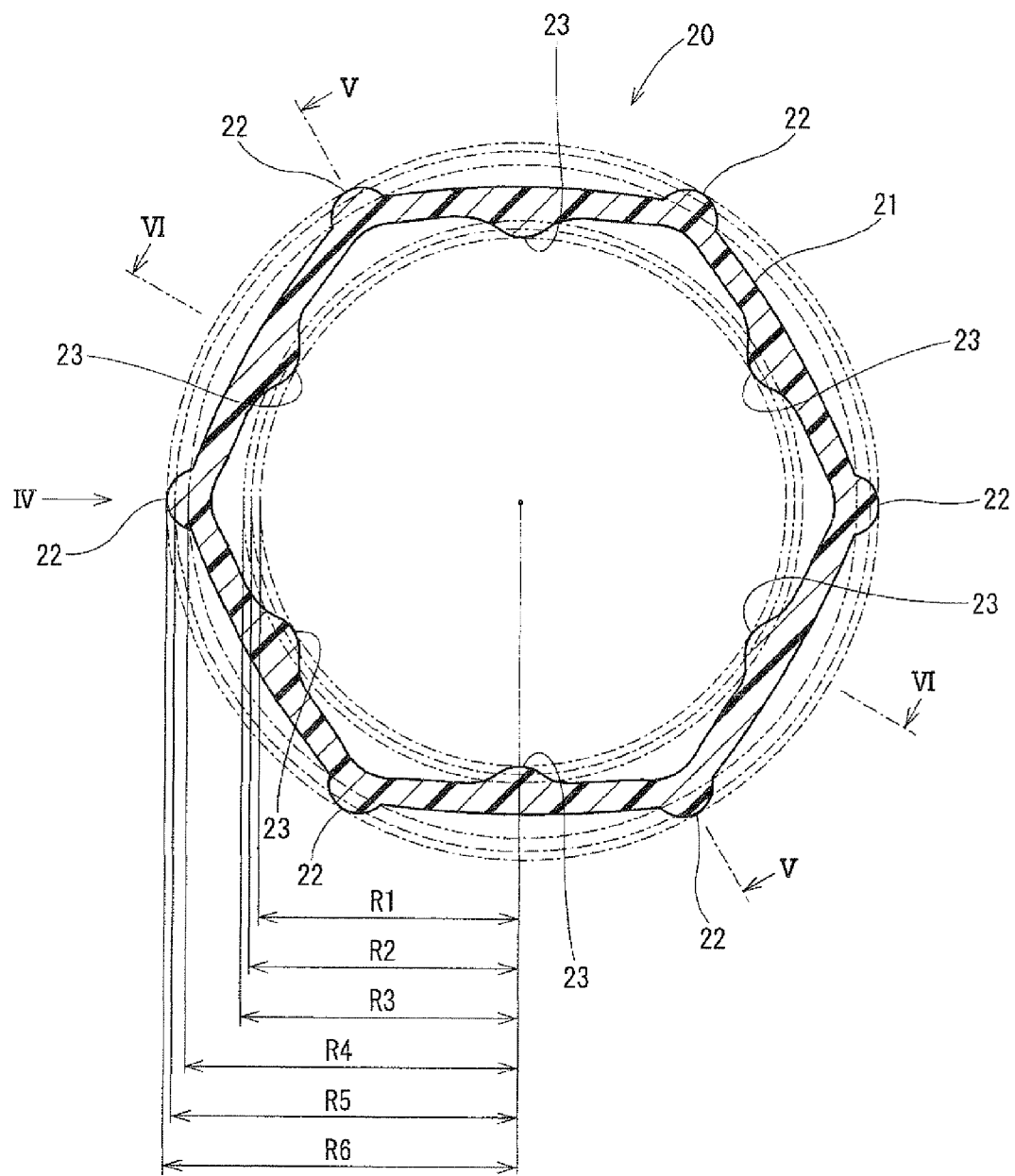
FIG. 3 is a schematic cross-sectional view showing a spring damper according to the first embodiment of the invention.
Figure 4:
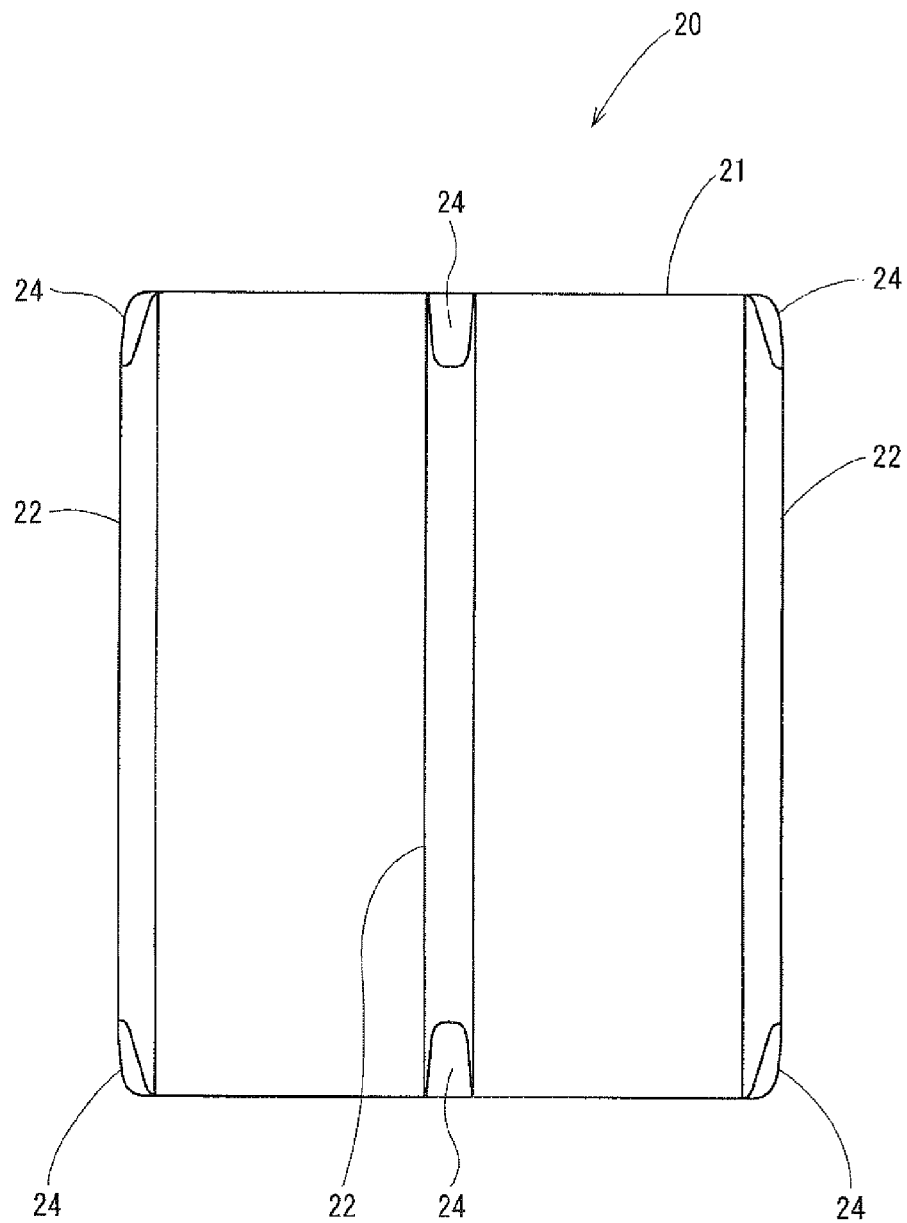
FIG. 4 is a side view showing the spring damper when viewed in a direction of IV in FIG. 3.
Figure 5:
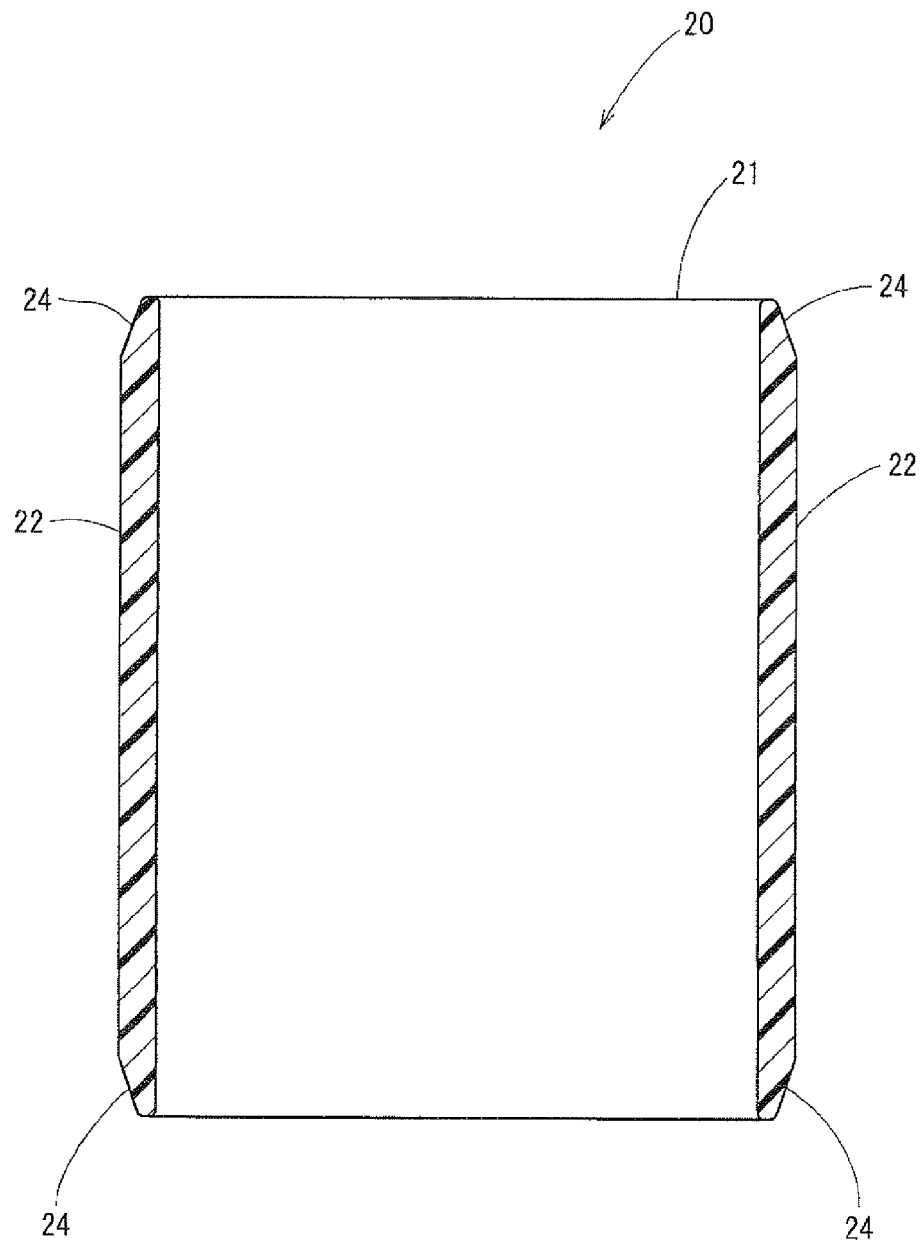
FIG. 5 is a schematic cross-sectional view taken along a line V-V in FIG. 3.
Figure 6:
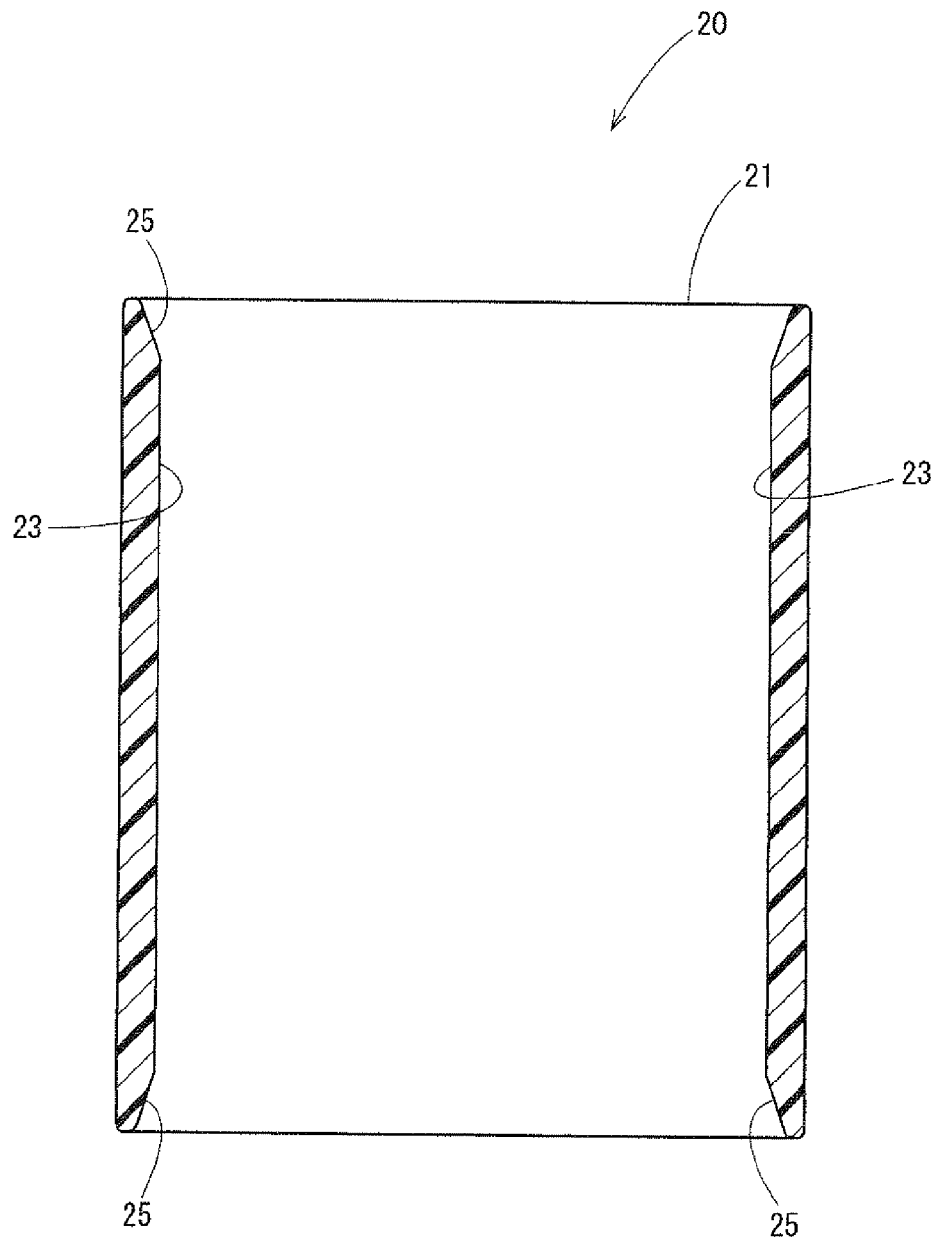
FIG. 6 is a schematic cross-sectional view taken along a line VI-VI in FIG. 3.

The configuration of the spring damper 20 before being assembled to the double coil spring 4 is shown in FIG. 3. In FIG. 3, each of R1 to R6 designates a distance from an axial center of the spring damper 20. In this condition, an outer diameter of the spring damper is "R6×2", while an inner diameter thereof is "R1×2".

Figure 7:
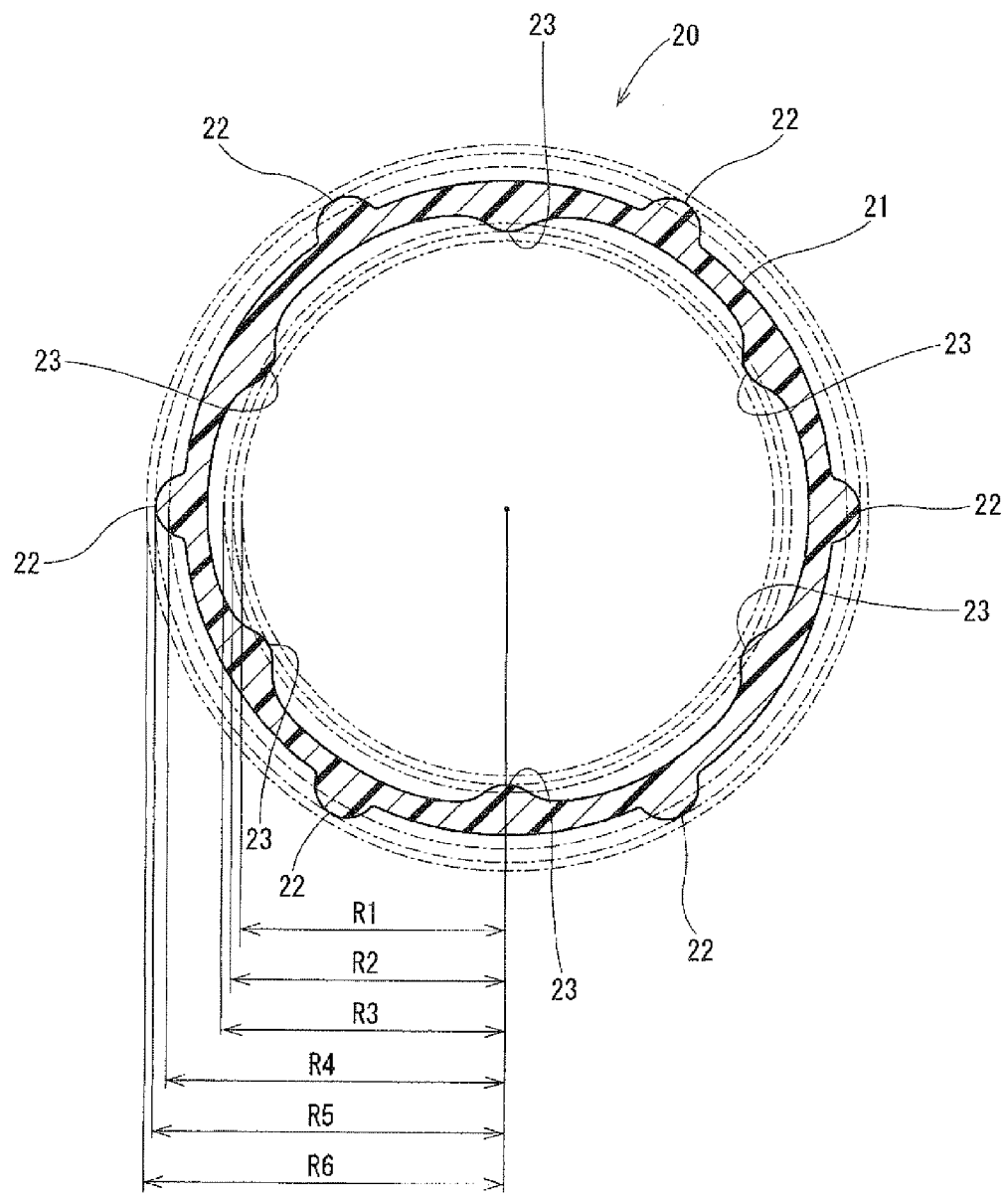
FIG. 7 is an explanatory view showing an applicable range of the spring damper according to the first embodiment.
Figure 8:
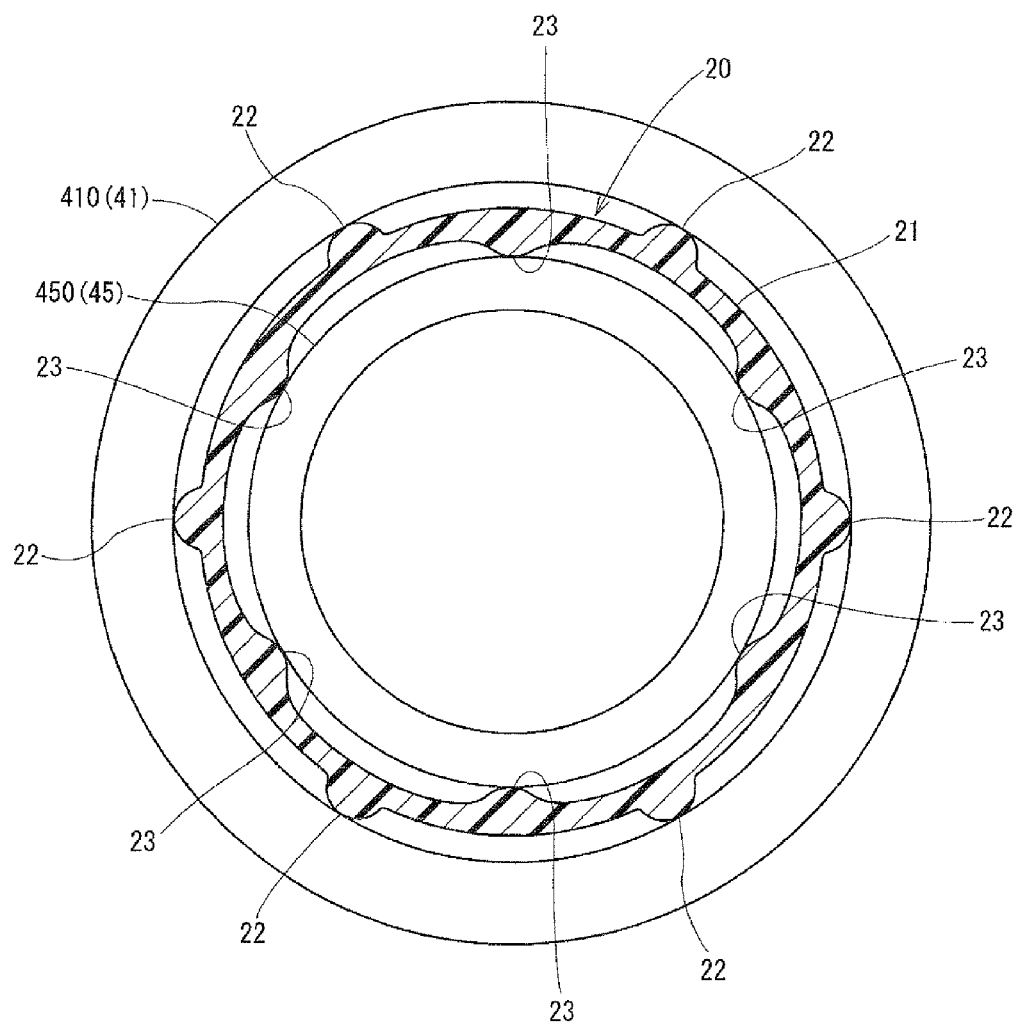
FIG. 8 is also an explanatory view showing the applicable range of the spring damper according to the first embodiment.

FIG. 7 shows the spring damper 20, which is applied to the double coil spring 4 having maximum space formed between the outer and inner coil springs 41 and 45. In this case, the outer diameter of the spring damper is "R5×2", while the inner diameter thereof is "R2×2". When compared with the spring damper 20 before being assembled to the double coil spring, the distance of the outer-wall convex portion 22 from the axial center is changed from "R6" to "R5", while the distance of the inner-wall convex portion 23 from the axial center is changed from "R1" to "R2". Namely, since the cylindrical body 21 is elastically deformed so that an inner angle formed between neighboring side portions of the hexagonal shape is made larger, each side is deformed in an arc shape. As a result, the cross sectional shape of the cylindrical body 21 is formed in almost a circular shape. FIG. 8 schematically shows the double coil spring having the maximum space to which the spring damper 20 is applied. The outer-wall convex portions 22 push an outer coil spring 410 in a radial outward direction by a reactive force of the elastic deformation of the cylindrical body 21, while the inner-wall convex portions 23 push an inner coil spring 450 in a radial inward direction by the reactive force.

Figure 9:
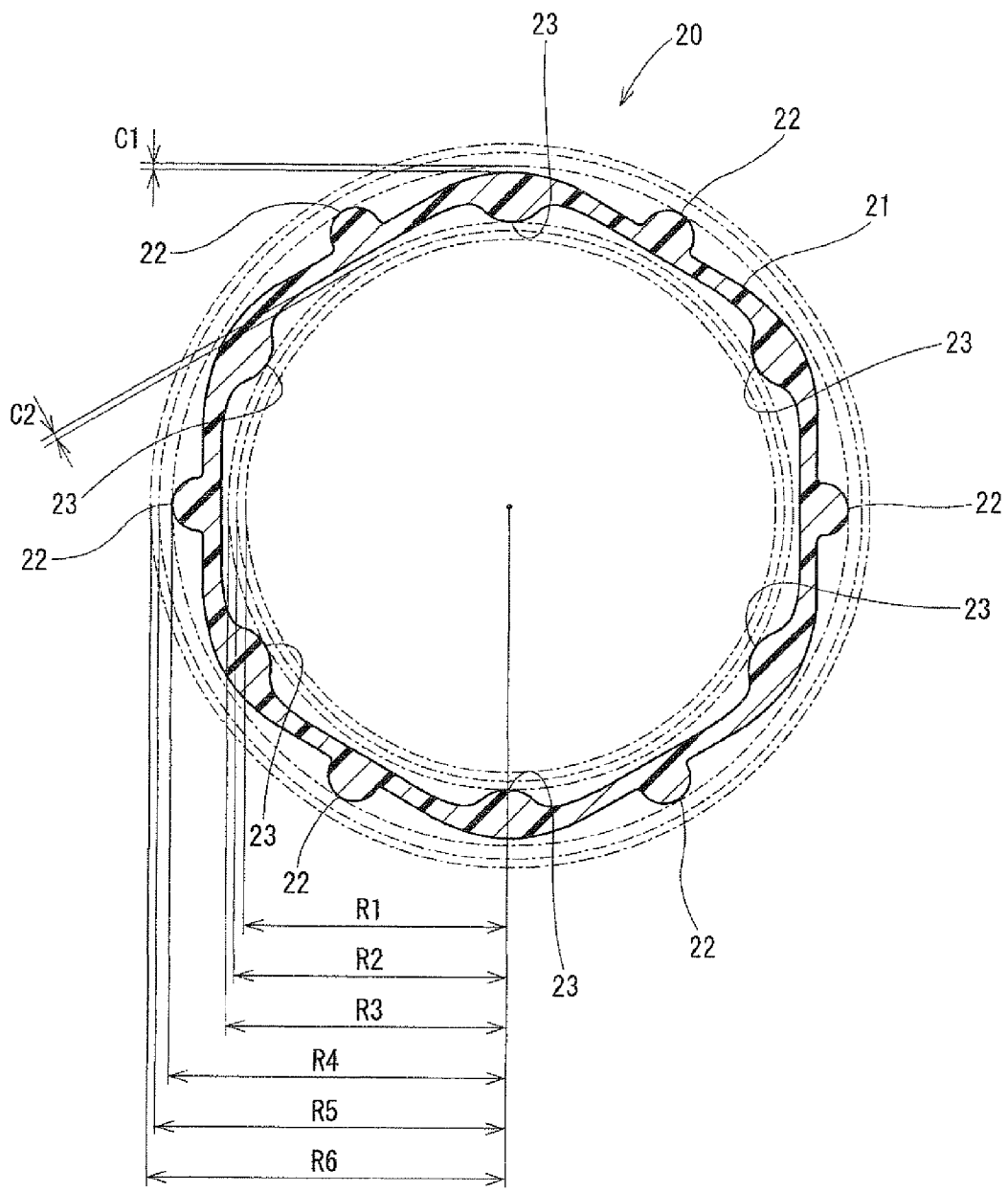
FIG. 9 is further an explanatory view showing the applicable range of the spring damper according to the first embodiment.

FIG. 9 shows the spring damper 20, which is applied to the double coil spring 4 having minimum space formed between the outer and inner coil springs 41 and 45. In this case, the outer diameter of the spring damper is "R4×2", while the inner diameter thereof is "R3×2". When compared with the spring damper 20 before being assembled to the double coil spring, the distance of the outer-wall convex portion 22 from the axial center is changed from "R6" to "R4", while the distance of the inner-wall convex portion 23 from the axial center is changed from "R1" to "R3".

Namely, as a result that the cylindrical body 21 is elastically deformed, the inner angle formed between neighboring side portions of the hexagonal shape is made larger than an angle of 180 degree, and each intermediate portion of the side portion is deformed to be further bent in the radial outward direction. As above, in the space formed between the outer and inner coil springs 41 and 45, the edge portions are bent in the radial inward direction on one hand, while the intermediate portions of the side portions are bent in the radial outward direction on the other hand, so that the cross sectional shape of the cylindrical body 21 is formed in a meandering shape.

Figure 10:
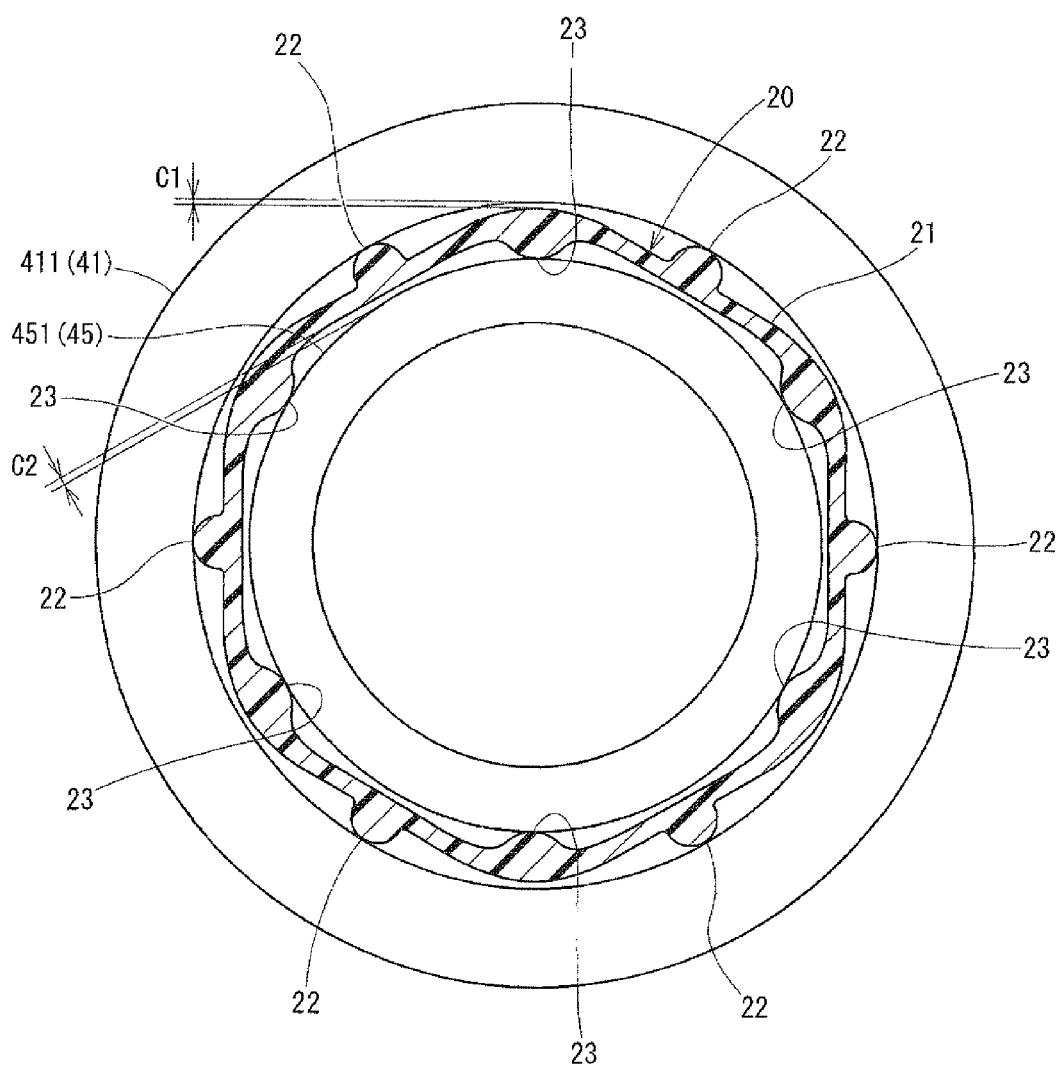
FIG. 10 is further an explanatory view showing the applicable range of the spring damper according to the first embodiment.

FIG. 10 schematically shows the double coil spring having the minimum space to which the spring damper 20 is applied.

The outer-wall convex portions 22 push an outer coil spring 411 in a radial outward direction by a reactive force of the elastic deformation of the cylindrical body 21, while the inner-wall convex portions 23 push an inner coil spring 451 in a radial inward direction by the reactive force. In the minimum space between the outer and inner coil springs 411 and 451, the spring damper 20 has a clearance C1 between an outer wall of the intermediate portion of the respective side portions and an inner wall of the outer coil spring 411. The spring damper 20 likewise has a clearance C2 between an inner wall of the respective edge portions and an outer wall of the inner coil spring 451. Therefore, the cylindrical body 21 (except for the convex portions 22 and 23) is prevented from being in contact with the outer or inner coil spring 411 or 451.

The spring damper 20 is assembled to the double coil spring 4, for example, in the following manner. At first, the inner coil spring 45 is inserted into the inside of the spring damper 20, and then the inner coil 45 together with the spring damper 20 is inserted into the inside of the outer coil spring 41. The spring damper 20 can be easily assembled to the double coil spring 4, because the spring damper 20 is formed in the hexagonal shape and degree of elasticity of the elastic material for the spring damper is selected at an appropriate value.

The longitudinal ends of the cylindrical body 21 of the spring damper 20 are prevented by the tapered portions 24 and 25 from being in contact with spring wires (inner surfaces of the outer coil spring 41 and outer surfaces of the inner coil spring 45), so that function of the spring damper 20 may not be adversely affected by possible contacts between the longitudinal ends and the outer or inner coil spring.

An operation of the acceleration device 1 will be explained with reference to FIGS. 1 and 2.

The acceleration pedal 2 is biased by the double coil spring 4 in the direction (the direction Y) opposite to the direction (the direction X), in which the acceleration pedal 2 is moved when it is operated by the vehicle driver. In this situation, a contacting portion 68 of the pedal rotor 60 is in contact with a stopper 125 formed in the top plate 12.

When the vehicle driver operates to push the acceleration pedal 2, the acceleration pedal 2 is rotated in the direction X. Since the helical gears 65 and 73 are engaged with each other, the spring rotor 70 is rotated together with the pedal rotor 60. The rotational-angle sensor 30 detects rotational angle of the shaft member 80 which is rotated together with the pedal rotor 60, based on the magnetic field formed by the magnets 84 and 85. The detected signal detected by the rotational-angle sensor 30 is transmitted to the ECU via the connector 16.

When the acceleration pedal 2 is moved by the vehicle driver in the direction X, the double coil spring 4 is compressed depending on the rotational-angle of the acceleration pedal 2. Reaction force "Fsp" given by the double coil spring 4 to the acceleration pedal 2 is thereby increased. Therefore, foot-stepping force "F" (pushing force by the vehicle driver) to the acceleration pedal 2 is increased in proportion to the rotational angle of the acceleration pedal 2.

A thrust force is generated by the reaction force "Fsp" and the foot-stepping force "F" in such a way that the helical gear 65 of the pedal rotor 60 and the helical gear 73 of the spring rotor 70 are separated from each other in the direction of the rotational axis "O". Then, a frictional force "f1" is generated between the friction ring 67 of the pedal rotor 60 and the side plate 13 by the thrust force. Likewise, a frictional force "f2" is generated between the friction washer 32 and the spring rotor 70 by the thrust force. The frictional forces "f1" and "f2" will be increased as the rotational angle of the acceleration pedal 2 becomes larger. Since the frictional forces "f1" and "f2" work as a resistance for the rotational movement of the acceleration pedal 2, the foot-stepping force "F" by the vehicle driver will be increased when the acceleration pedal 2 is rotated in the direction X.

When the acceleration pedal 2 is further rotated by the vehicle driver in the direction X, a contacting portion 69 is brought into contact with a stopper 111 formed in the bottom plate 11. Then, the further movement of the acceleration pedal 2 is limited.

When the acceleration pedal 2 is rotated in the direction Y, the foot-stepping force "F" by the vehicle driver will be decreased, wherein the frictional forces "f1" and "f2" work as a resistance for the rotational movement of the acceleration pedal 2.

According to the above the acceleration device 1, the frictional forces "f1" and "f2" are changed depending on the rotational position of the acceleration pedal 2. Therefore, the acceleration device 1 has a hysteresis, according to which the foot-stepping force "F" when moving the acceleration pedal 2 in the direction X is different from the foot-stepping force "F" when moving the acceleration pedal 2 in the direction Y. As a result, the acceleration device 1 may give a favorable operational feeling to the vehicle driver.

An operation of the double coil spring 4 and the spring damper 20, when rotating the acceleration pedal 2 of the acceleration device 1 in the direction X and in the direction Y, will be further explained with reference to FIGS. 11 and 12.

Figure 11:
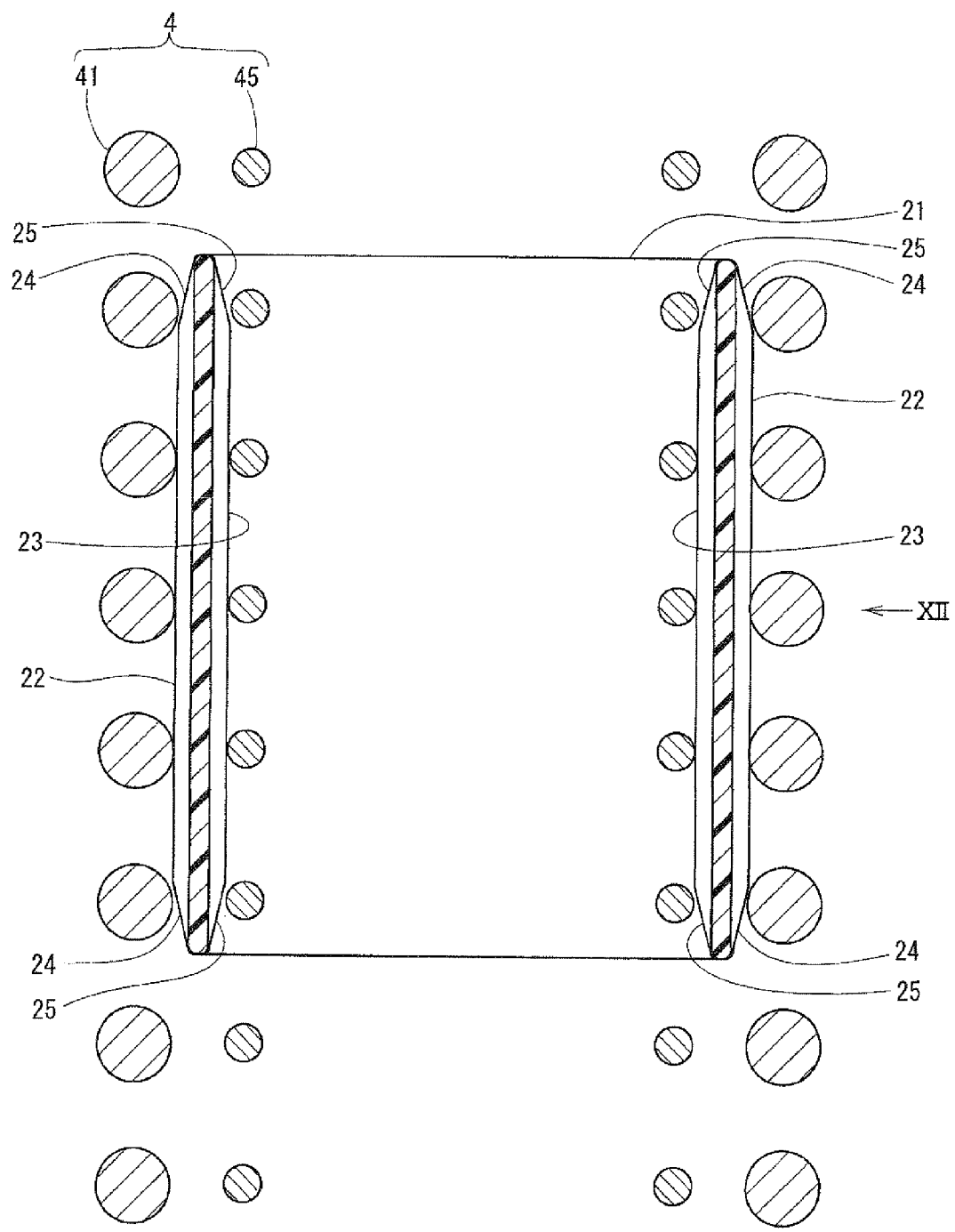
FIG. 11 is an explanatory view showing a double coil spring for the acceleration device of the first embodiment to which the spring damper of the invention is used.

The spring damper 20 is arranged between the outer coil spring 41 and the inner coil spring 45, as shown in FIG. 11. The cylindrical body 21 is deformed depending on the annular space formed between the outer and inner coil springs 41 and 45, so that the cross sectional hexagonal shape is deformed to absorb variation of the annular space. And, as already explained, the outer-wall convex portions 22 push the outer coil spring 41 in the radial outward direction by the reactive force of the elastic deformation of the cylindrical body 21, while the inner-wall convex portions 23 push the inner coil spring 45 in the radial inward direction by the reactive force.

When the acceleration pedal 2 is rotated in the direction X and thereby the double coil spring 4 is compressed in its axial direction, the outer-wall convex portions 22 and the outer coil spring 41 slide on each other while the inner-wall convex portions 23 and the inner coil spring 45 slide on each other.

During this operation, the tapered portions 24 and 25 of the outer-wall convex portions 22 and the inner-wall convex portions 23 prevent the longitudinal ends of the cylindrical body 21 from being brought into contact with spring wires of the outer and inner coil springs 41 and 45. As a result, the longitudinal ends of the cylindrical body 21 are prevented from getting hung up by the spring wires of the outer and inner coil springs 41 and 45, and thereby the longitudinal ends of the spring damper 20 is prevented from being hooked by the outer or inner coil springs 41 or 45.

Figure 12:
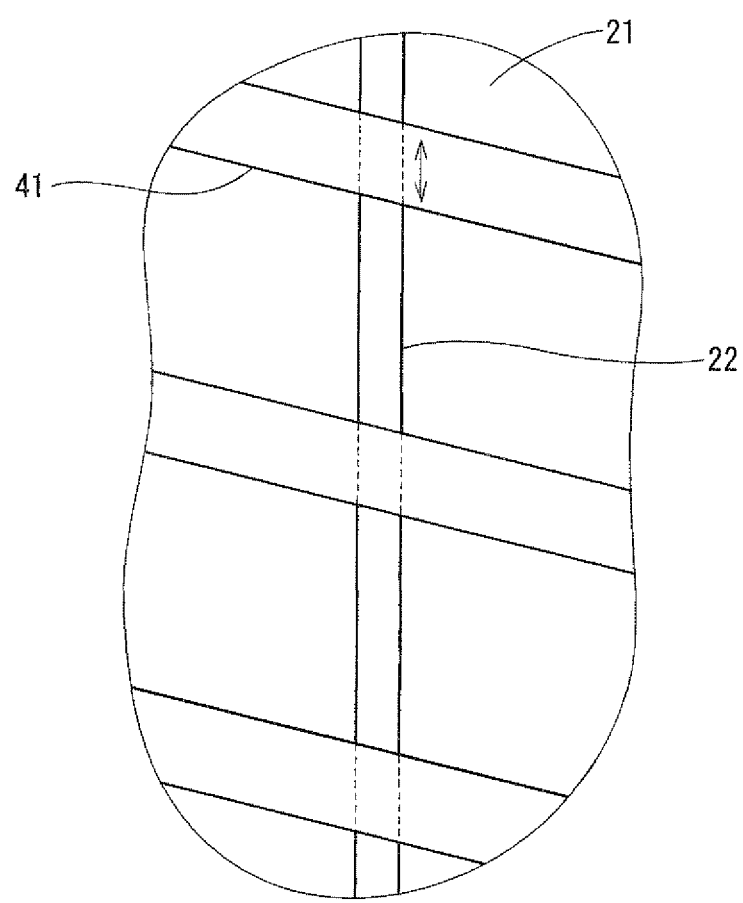
FIG. 12 is a partial enlarged view showing an outer-wall convex portion and spring wires when viewed in a direction XII in FIG. 11.

When the acceleration pedal 2 is rotated in the direction Y and thereby the double coil spring 4 is expanded in its axial direction, the outer-wall convex portions 22 and the outer coil spring 41 slide on each other while the inner-wall convex portions 23 and the inner coil spring 45 slide on each other, as shown in FIG. 12. During this operation, the outer-wall convex portions 22 push the outer coil spring 41 in the radial outward direction by the reactive force of the elastic deformation of the cylindrical body 21, and the inner-wall convex portions 23 push the inner coil spring 45 in the radial inward direction by the reactive force. As a result, the spring damper 20 prevents the characteristic vibration of the outer and inner coil springs 41 and 45.

Figure 14:
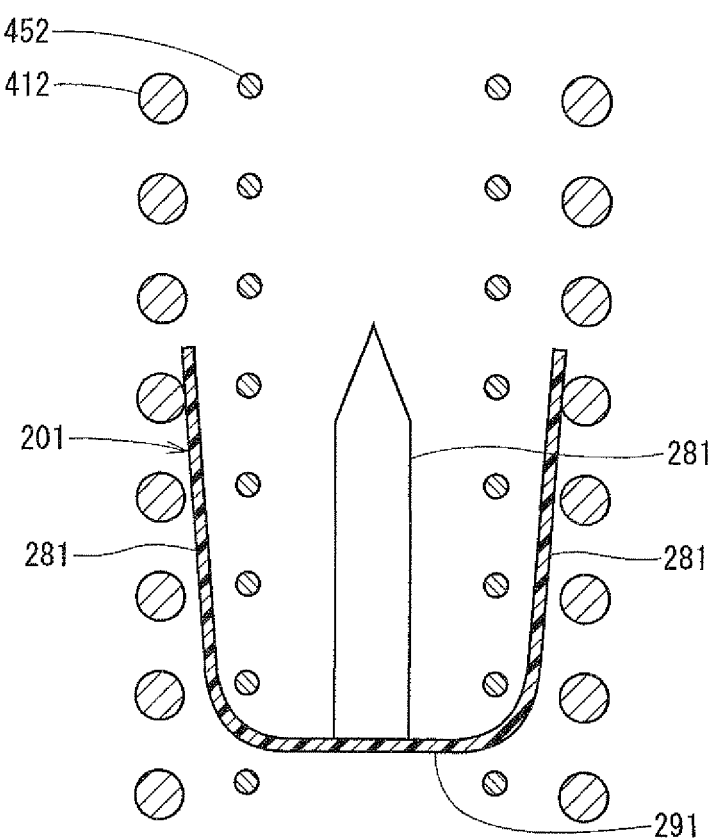
FIG. 14 is a schematic view showing a double coil spring to which a spring damper of a comparative example is applied.
Figure 15:
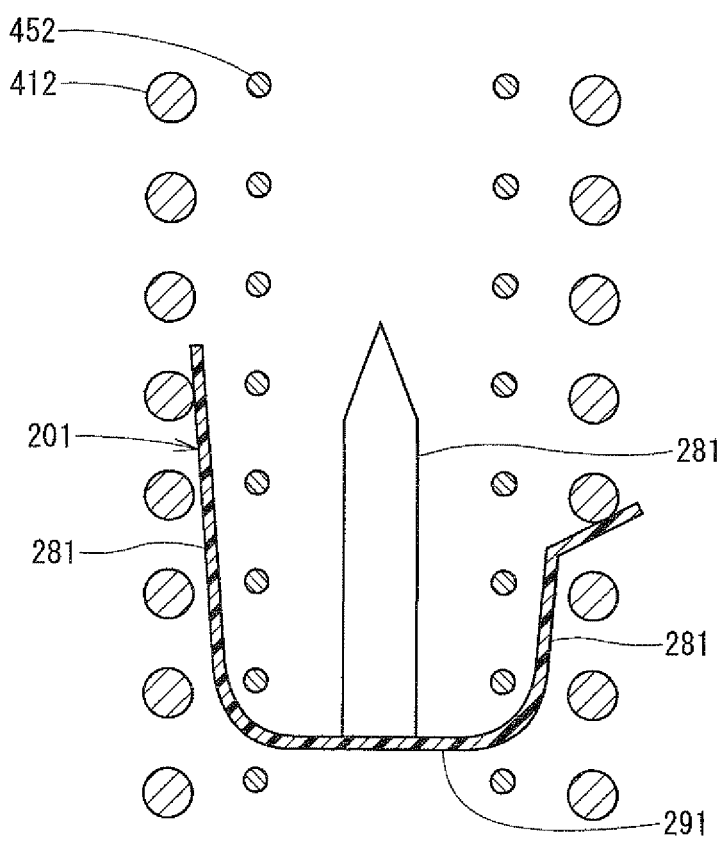
FIG. 15 is also a schematic view showing the double coil spring to which the spring damper of the comparative example is applied, wherein a forward end of the spring damper is inserted into a longitudinal gap of neighboring spring wires of an outer coil spring.

FIGS. 14 and 15 show a spring damper 201 as a comparative example.

The spring damper 201 is composed of a cross-shaped plate member made of elastic material being capable of elastic deformation. The spring damper 201 is assembled to the double coil spring in the following manner. At first, a center portion 291 of the spring damper 201 is inserted into a longitudinal gap formed between neighboring spring wires of the inner coil spring 452. Then, the spring damper 20 and the inner coil spring 452 are inserted into an inside space of the outer coil spring 412.

As shown in FIG. 15, there is a concern that a forward end 281 of the spring damper 201 may be easily inserted into a longitudinal gap of spring wires of the outer coil spring 412 and outwardly protrude when the double coil spring is expanded. When the forward end 281 of the spring damper 201, which has outwardly protruded from the outer coil spring 412 through the longitudinal gap, is compressed between the neighboring spring wires during the compression of the double coil spring, it may become difficult for the spring damper 201 to properly push the outer coil spring 412 and the inner coil spring 452.

On the other hand, according to the embodiment of the present invention, the spring damper 20 is composed of the cylindrical body 21, the outer-wall convex portions 22, and the inner-wall convex portions 23. According to such structure, the longitudinal ends of the spring damper 20 are prevented from being interposed between the neighboring spring wires of the outer coil spring 41 or the inner coil spring 45, when the double coil spring 4 is compressed.

In addition, the cross sectional configuration of the cylindrical body 21 is formed in the hexagonal shape. As a result, even when the spring damper 20 is assembled to the different types of the double coil springs, each of which has its own different annular space between the outer and inner coil springs 41 and 45, the edge portions are deformed to be curved in the radial inward direction in a range of R5-R4, while the intermediate portions of the respective side portions are deformed to be curved in the radial outward direction in a range of R2-R3, so as to absorb variations of the annular spaces between the outer and the inner coil springs. Therefore, the spring damper 20 can be applied to a variety of the double coil springs having different coil diameters.

In addition, the outer-wall convex portions 22 are formed at edge portions of the cylindrical body 21 (of the hexagonal shape) so as to project in the radial outward direction, and the inner-wall convex portions 23 are formed at intermediate portions of the respective side portions (of the hexagonal shape) so as to project in the radial inward direction. As a result, displacement amounts at the edge portions and the intermediate portions of the spring damper 20 can be made larger. Therefore, the spring damper 20 can surely generate reactive forces by the elastic deformation of the cylindrical body 21 so as to surely push the outer coil spring 41 and the inner coil spring 45.

Furthermore, each of the outer-wall convex portions 22 and the inner-wall convex portions 23 has the tapered portion 24 and 25 at both longitudinal ends. When the spring damper 20 and the outer and inner coil springs 41 and 45 are relatively moved in the longitudinal direction of the spring damper from each other, in the case that the double coil spring is compressed or expanded, the longitudinal ends of the spring damper 20 are prevented from being hooked by the spring wires of the outer or the inner coil spring 41 or 45. As a result, the longitudinal ends of the spring damper 20 are prevented from being interposed between the neighboring spring wires of the outer coil spring 41 or the inner coil spring 45.

As above, the spring damper 20 can surely attenuate the characteristic vibrations of the double coil spring. Accordingly, in the acceleration device having the spring damper of the present invention, generation of abnormal noises due to the characteristic vibration of the double coil spring can be suppressed.

Second Embodiment

Figure 13:
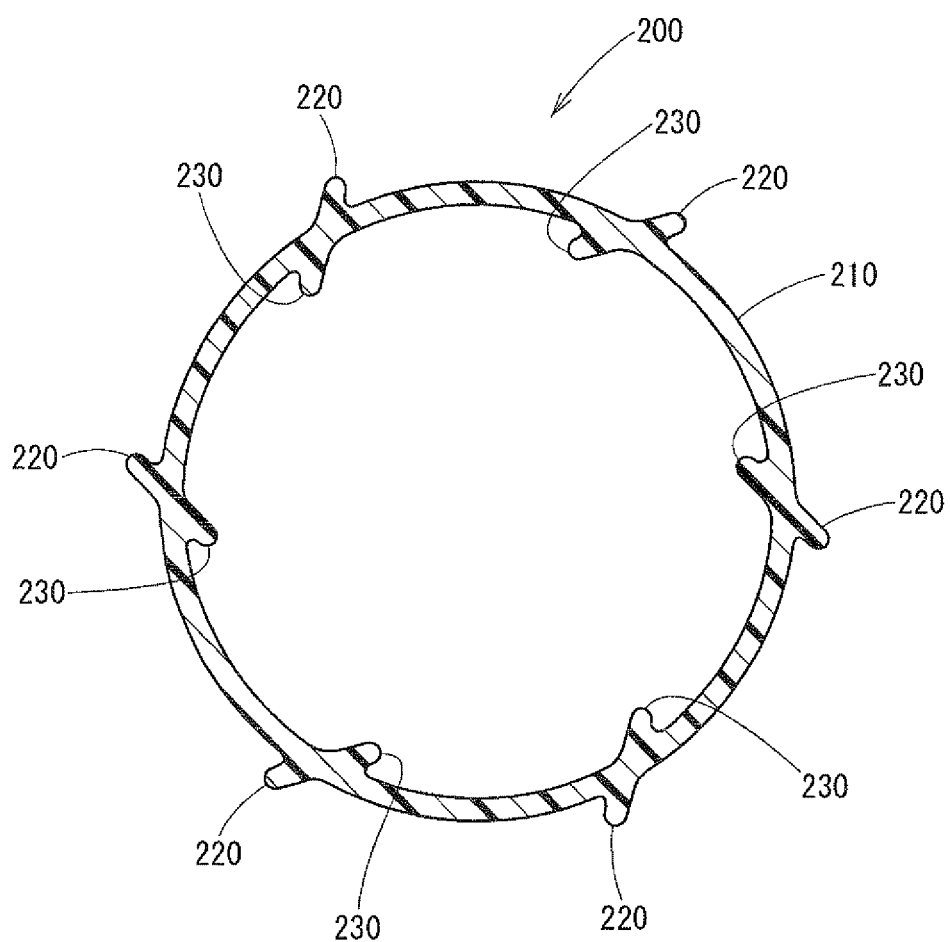
FIG. 13 is a schematic cross-sectional view showing a spring damper according to a second embodiment of the invention.

A spring damper 200 according to a second embodiment is shown in FIG. 13.

The spring damper 200 is composed of a cylindrical body 210, a plurality of outer-wall convex portions 220, and a plurality of inner-wall convex portions 230. A cross sectional shape of the cylindrical body 210 is formed in a circular form.

Each of the outer-wall convex portions 220 outwardly projects from an outer wall of the cylindrical body 210, wherein the outer-wall convex portion 220 is inclined from a radial direction. The outer-wall convex portions 220, a number of which is six in the embodiment, are arranged at equal distances in a circumferential direction of the cylindrical body 210. Each of the outer-wall convex portions 220 extends in a longitudinal direction of the cylindrical body 210 from its one end to the other end, and has tapered portions (not shown) at its longitudinal ends such that a projecting amount of the convex portion is reduced toward a forward end of the respective longitudinal ends.

Each of the inner-wall convex portions 230 inwardly projects from an inner wall of the cylindrical body 210, wherein the inner-wall convex portion 230 is inclined from a radial direction. An inclined angle of the inner-wall convex portion 230 is almost equal to that of the outer-wall convex portion 220. The inner-wall convex portions 230, a number of which is six in the embodiment, are arranged at equal distances in a circumferential direction of the cylindrical body 210. Each of the inner-wall convex portions 220 extends in the longitudinal direction of the cylindrical body 210 from its one end to the other end, and has tapered portions (not shown) at its longitudinal ends such that a projecting amount of the convex portion is reduced toward a forward end of the respective longitudinal ends.

According to the present embodiment, the spring damper 200 is composed of, as explained above, the cylindrical body 210, the outer-wall convex portions 220, and the inner-wall convex portions 230. The outer-wall convex portions 220 push an outer coil spring (not shown) in a radial outward direction, whereas the inner-wall convex portions 230 push an inner coil spring (not shown) in a radial inward direction. As a result, in the case that the spring damper 200 is applied to a double coil spring (not shown), the longitudinal ends of the spring damper 220 are prevented from being disposed between neighboring spring wires of the outer or inner coil spring.

In addition, the outer-wall and inner-wall convex portions 220 and 230 are formed so as to be inclined from the radial direction. As a result, even when the spring damper 200 is assembled to different types of the double coil springs, each of which has its own different annular space between the outer and inner coil springs, the outer-wall convex portions 220 as well as a wall portion of the cylindrical body 210 adjacent to the outer-wall convex portions 220 are deformed to be curved in the radial inward direction, while the inner-wall convex portions 230 as well as a wall portion of the cylindrical body 210 adjacent to the inner-wall convex portions 230 are deformed to be curved in the radial outward direction. As a result, variations of the annular spaces between the outer and the inner coil springs may be absorbed. Therefore, the spring damper 200 can be applied to a variety of the double coil springs having different coil diameters.

Furthermore, the outer-wall convex portions 220 and the inner-wall convex portions 230 are formed at such positions, which are close to each other in the circumferential direction. According to such structure, the outer-wall convex portions 220 and the inner-wall convex portions 230 can surely push the outer and inner coil springs by the reactive forces of the elastic deformation.

As above, the spring damper 200 can surely attenuate the characteristic vibrations of the double coil spring and suppress generation of abnormal noises.

Other Embodiments

According to the first embodiment, the spring damper has the cylindrical body, the cross sectional shape of which is formed in the hexagonal form. The present invention may be applied to another type of a spring damper having a cylindrical body, a cross-sectional shape is formed in a polygonal form.

According to the above embodiments, the outer-wall convex portions and the inner-wall convex portions are formed in number of six, respectively. The present invention should not be limited to the number of convex portions.

Furthermore, according to the above embodiments, the acceleration device, to which the spring damper of the invention is applied, is explained. The spring damper of the present invention may be applied to any other types of devices having the double coil spring.

As above, the invention shall not be limited to the spring damper explained in the above embodiments, but may be modified in various ways without departing from the spirit of the invention.

What is claimed is:

1. A spring damper made of elastic material and configured to be inserted between an inner coil spring and an outer coil spring of a double coil spring comprising:
a generally cylindrical body, the generally cylindrical body being made of elastic material and having generally straight wall sections that form a polygonal cross-sectional shape when no forces are applied to the generally cylindrical body;
a plurality of outer-wall convex portions formed at an outer wall of the generally cylindrical body and extending in a longitudinal direction of the generally cylindrical body from its one longitudinal end to the other longitudinal end, each of the outer-wall convex portions being located at an intersection of two generally straight wall sections and outwardly projecting, each of the outer-wall convex portions being elastically deformable in a radial inward direction, wherein the outer-wall convex portions will generate an outward radial force upon being deformed in the radial inward direction; and
a plurality of inner-wall convex portions formed at an inner wall of the generally cylindrical body and extending in the longitudinal direction of the generally cylindrical body from its one longitudinal end to the other longitudinal end, each of the inner-wall convex portions inwardly projecting and being elastically deformable in a radial outward direction, wherein the inner-wall convex portions will generate an inward radial force upon being elastically deformed in the radial outward direction,
wherein a cross-sectional shape of the generally straight wall sections is changed when the outer-wall convex portions are deformed in the radial inward direction and the inner-wall convex portions are deformed in the radial outward direction such that the cross-sectional shape changes from the polygonal cross-sectional shape to another cross-sectional shape.

2. The spring damper according to the claim 1, wherein the inner-wall convex portions are formed at intermediate portions of respective generally straight wall sections of the generally cylindrical body.

3. The spring damper according to the claim 1, wherein each of the outer-wall convex portions has tapered portions at the longitudinal ends, a projecting amount of the tapered portion being gradually reduced toward a forward end of the respective longitudinal ends.

4. The spring damper according to the claim 1, wherein each of the inner-wall convex portions has tapered portions at the longitudinal ends, a projecting amount of the tapered portion being gradually reduced toward a forward end of the respective longitudinal ends.

5. An acceleration device for a vehicle comprising:
a supporting member;
an acceleration pedal rotatably supported by the supporting member and operated by a vehicle driver;
a double coil spring having an outer coil spring and an inner coil spring for biasing the acceleration pedal in a direction, which is opposite to a direction in which the acceleration pedal is moved when the vehicle driver pushes it; and
a spring damper defined in the claim 1, which is arranged in an annular space formed between the outer and inner coil springs.

6. The spring damper according to claim 1, wherein the cross-sectional shape of the generally cylindrical body forms a hexagon before and after the generally cylindrical body is assembled to a double coil spring.

7. The spring damper according to claim 1, wherein the spring damper is configured such that it can be assembled to the double coil spring by first inserting the inner coil spring into an inside of the generally cylindrical body, and then inserting the combination of the inner coil spring and the spring damper into an inside of the outer coil spring.

8. The spring damper according to claim 1, wherein the generally cylindrical body is deformable such that when the generally cylindrical body is assembled into an annular space between the inner coil spring and the outer coil spring of the double coil spring, the cross-sectional shape of the generally cylindrical body can change from the polygonal cross-sectional shape to a generally circular cross-sectional shape.

* * * * *